United States Patent Office 3,772,385

Patented Nov. 13, 1973

1

3,772,385

CARBAMATES CONTAINING AN OXIME ETHER FUNCTION

Adolf Hubele, Riehen, near Basel, Switzerland, assignor to Ciba-Geigy AG, Basel, Switzerland No Drawing. Continuation-in-part of abandoned application Ser. No. 786,762, Dec. 24, 1968. This application Nov. 4, 1971, Ser. No. 195,822

Int. Cl. C07c *131/12*

U.S. Cl. 260—472 13 Claims

ABSTRACT OF THE DISCLOSURE

The invention relates to new oxime ethers of the formula

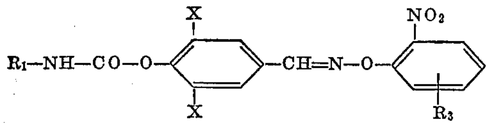

wherein $R_1$, $R_2$, $R_3$ and X have the meanings given below.

Said oxime ethers are used in herbicidal preparations for controlling undesired plant growth in cultures of cereals, maize, rice and soya. Some of these ethers can also be used for combatting pests of the order acerinae.

CROSS REFERENCE

This application is a continuation-in-part of my application, Ser. No. 786,762 filed Dec. 24, 1968, now abandoned.

DETAILED DISCLOSURE

The present invention relates to active substances for compositions for controlling undesirable plant growth in cultures of useful plants, such as cereals, maize, rice and soya and some of these compounds are also useful for combatting pests of the order acarinae (mites, ticks etc.).

The active substances are compounds of the Formula I

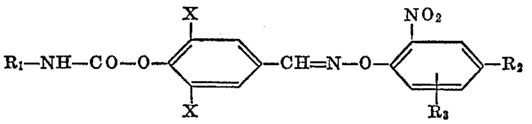

wherein $R_1$ is a lower alkyl radical, with 1 to 4 carbon atoms, which is unsubstituted or substituted by a chlorine atom, a phenyl radical that is unsubstituted or mono to trisubstituted by members of the group consisting of halogen atoms, methyl, methoxy, trifluoromethyl or nitro groups, or $R_1$ is the benzyl phenylethyl or cyclohexyl radical;

$R_2$ is a nitro, formyl, methoxycarbonyl or di-lower alkyl sulfamyl radical, wherein the lower alkyl groups have 1 to 4 carbon atoms;

$R_3$ is a hydrogen or chlorine atom, a lower alkyl, lower alkoxy group with 1 to 4 carbon atoms, the methoxycarbonyl or di-ethylsulfamyl group and X are identical and represent chlorine, bromine or iodine atoms.

In these definitions under "lower alkyl" groups with 1 to 4 carbon atoms, the straight chained or branched radicals methyl, ethyl, n-propyl, isopropyl, n-butyl, isobutyl, sec. butyl and tert. butyl are understood.

2

The present invention claims the new oxime-ether-carbamates of Formula I.

The invention at the same time claims pesticides which contain compounds of Formula I as active substances together with suitable carriers.

The new compounds are produced by known methods according to following indication:

The starting products of Formula II

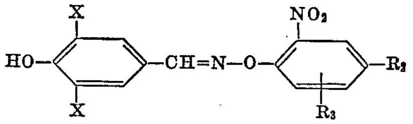

(II)

which are necessary for the manufacture of the compounds of Formula I can be manufactured in a simple manner, for example from 3,5-dihalogeno-4-hydroxybenzyldoxime and an appropriately substituted chlorobenzene of formula

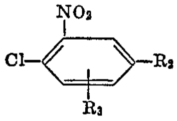

in alkaline solution.

If these compounds of Formula II are to be converted to esters of General Formula I then, provided the reaction is not too drastic, all usual esterification methods can be applied to the conversion of the phenolic OH group. In order to ensure mild conditions, it is appropriate to start from the phenolate and to react with appropriate carboxylic acid halides. It is also possible to produce the phenylester grouping at temperatures in the range of 0° to 160° C. with carboxylic acids or carboxylic acid anhydrides, with acid esters or lactones or in individual cases also with ketenes.

For converting the starting products II to the corresponding carbamates, the phenolic OH group can be reacted according to usual methods with isocyanates of the type $$R_1—NCO$$

or with compounds which can transiently form these isocyanates, or also with carbamic acid chlorides of the type $$R_1—NH—COCl$$

or of the type $$R_1—N(CH_3)—COCl$$

It is however also possible first to manufacture the corresponding phenolchlorocarbonate from the OH group by means of $COCl_2$ and then to allow this, where possible, to react with an amine $R_1—NH_2$ or $R_1—NH—CH_3$.

$R_1$ in each case has the significance given for Formula I. Possible solvents are generally acetonitrile, ether, dioxane, dimethylformamide, dimethylsulphoxide and others.

The herbicidal selectivity in varieties of grain, maize and rice on the one hand and in leguminosae (peas, beans, soya beans, clover and lucerne) on the other, on post-emergent treatment, follows for all compounds of Formula I from the field of use initially quoted, though to different extents. Particularly outstanding representatives are those of general Formula III

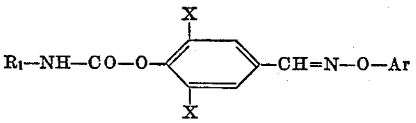

(III)

wherein $R_1$ and X have the significance given initially and Ar especially represents the following substituted phenyl groups:

Ar

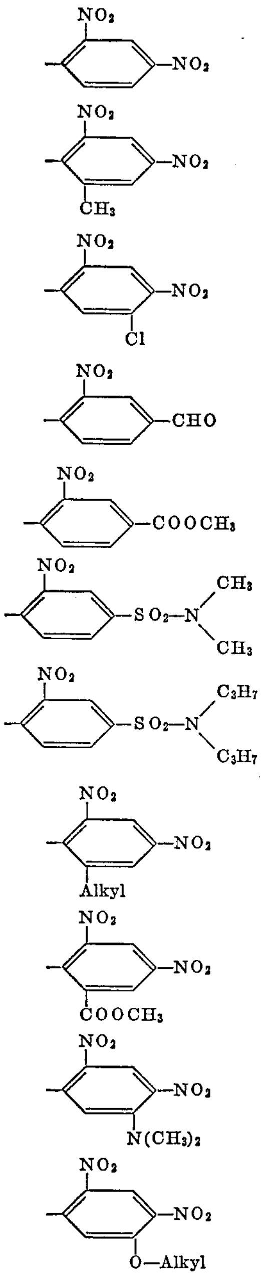

The acaricidal action of a series of representatives of Formula I, which has been observed against all kinds of representatives of the order Acarina such as ticks, mites, spinning mites and the like, should also be emphasised. Here it is worth mentioning that the amounts used can be chosen at an order of magnitude which lies below any influence on the plants.

Typical representatives of this are compounds of Formula III wherein Ar denotes the group

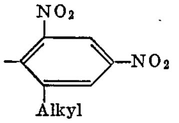

In the formulae quoted "alkyl" is intended to represent lower, including branched alkyl residues having at most 4 C atoms.

The new oxime-ether-carbamates can be used alone or mixed with other pesticides or biologically stimulating or inhibiting substances or with solid carriers, solvents, diluents, thickeners, dispersing agents, wetting agents or adhesives or optionally with the addition of fertilisers.

Depending on the end use, the new subtsnces can be used as pesticides in various ways such as form part of the state of the art and are for example described in U.S. Pat. 3,329,702 or British Pat. 1,047,644 or Swiss Pat. 424,359.

In many cases it is advantageous to use granules to achieve uniform release of active substances over a longer period of time. These granules can for example be manufactured by dissolving the active substance in an organic solvent, absorbing this solution by a granulated material, for example Attapulgite or $SiO_2$, and removing the solvent.

In the form of one or other use such materials can also be applied by distribution over large areas (spraying, dusting and the like) by means of aircraft.

The various use forms of such materials can be more closely suited to the end uses in the usual manner by adding substances which improve the distribution, adhesion, rain resistance and possibly the penetrating power, such as for example fatty acids, resins, wetting agents, glue, caseine or alginates.

In the manufacture of herbicidally active materials there are furthermore numerous possible components or use in combinations, of which the most important representatives are quoted below:

N - phenyl - N′, N′ - dimethylurea, N-p-chlorophenyl-N′, N′ - dimethylurea, N - 3,4 - dichlorophenyl-N′, N′-dimethylurea, N - 3,4 - dichlorophenyl-N′-methoxy-N′-methylurea, N - 4 - bromo - 3 - chlorophenyl-N′-methoxy-N′ - methylurea, trichloracetic acid, 2,6-dichlorobenzonitrile, 2,3,6 - trichlorobenzoic acid, 2,4-D, 2,4,5-T, MCPB, MCPP, isopropyl-carbanilate, isopropyl-3-chlorocarbanilate, N - 3 - chlorophenylcarbamic acid 4′-chlorobutin - 2 - yl - 1 - ester, 2,3,6-trichlorophenylacetic acid and salts, 2 - chlorodiallylacetamide, 2-chloro-4,6-bisethylamino - s - triazine, 2 - methoxy - 4,6 - bis-ethylamino - s - triazine, 2 - azido - 4 - methyl-thio-6-isopropylaminotriazine, the monomethylarsenate di-Na, salt, various arsenites, Na metaborate, Na chlorate and sulphamic acid.

When using the materials against ectoparasites on farm animals such as cattle, sheep, goats and others, it is advantageous to use dipping baths in which the active substances are present alone or, as described, in an emulsified or dispersed form.

In the following text the parts denote parts by weight.

EXAMPLE 1

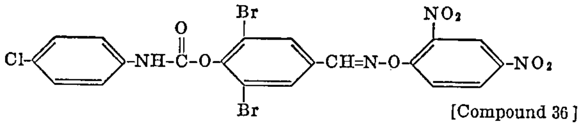

[Compound 36]

120 parts of 3,5-dibromo-4-hydroxybenzaldoxime-O-2′, 4′-dinitrophenyl ether are suspended in 800 parts by volume of ethyl acetate whilst stirring and 41 parts of 4 - chlorophenylisocyanate in 200 parts by volume of ethyl acetate are added at 50° C. The weakly exothermic reaction is initiated by adding 0.1 parts of triethylene diamine. After standing for four hours at room temperature the mixture is filtered and the product digested with hot acetonitrile and again filtered. Melting point: 194–195° C. (decomposition).

The following compounds of the type of

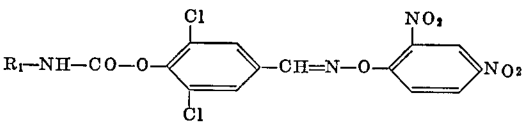

are obtained in an analogous manner.

| Compound No. | $R_1$ | Melting point, ° C. (decomposition) |
|---|---|---|
| 1 | $CH_3-$ | 200-201 |
| 2 | $C_2H_5-$ | 197-199 |
| 3 | $n-C_3H_7-$ | 193-194 |
| 4 | $iso-C_3H_7-$ | 194-197 |
| 5 | $Cl-CH_2-CH_2-$ | 190-192 |
| 6 | 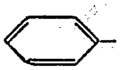 | 193-194 |
| 7 | 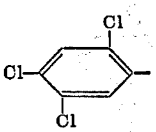 | 186-187 |
| 8 | 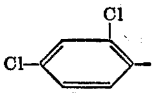 | 187-190 |
| 9 | 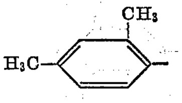 | 160-163 |
| 10 | 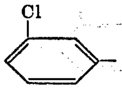 | 178-179 |
| 11 | 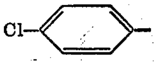 | 195-196.5 |
| 12 | 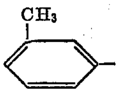 | 166-168 |
| 13 | 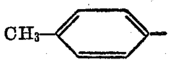 | 169-170 |
| 14 | 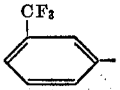 | 190-191.5 |
| 15 | 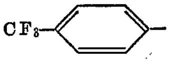 | 194-196 |
| 16 | 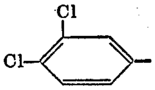 | 192-193 |
| 17 | 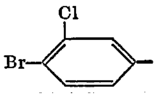 | 186-188 |
| 18 | 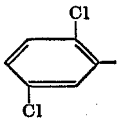 | 170-175 |
| 19 | 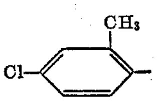 | 169-171 |
| 20 | 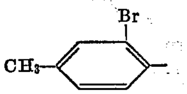 | 176-178 |
| 21 | 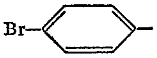 | 192-194 |
| 22 | 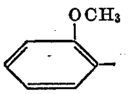 | 164-168 |
| 23 | 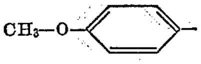 | |
| 24 | 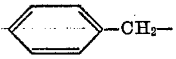 | |
TABLE—Continued
| Compound No. | $R_1$ | Melting point, ° C. (decomposition) |
|---|---|---|
| 25 | 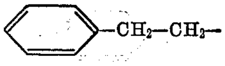 | |
| 26 | 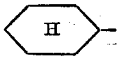 | |
The following compounds of the type of
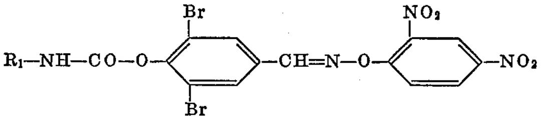
are obtained in an analogous manner.
| Compound No. | $R_1$ | Melting point, ° C. (decomposition) |
|---|---|---|
| 27 | $CH_3-$ | 205-206 |
| 28 | $C_2H_5-$ | 198-199 |
| 29 | $n-C_3H_7-$ | 196-197 |
| 30 | $iso-C_3H_7-$ | 193-196 |
| 31 | $n-C_4H_9-$ | 186-187 |
| 32 | $ClCH_2-CH_2-$ | 195-196 |
| 33 | 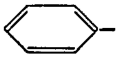 | 180-182 |
| 34 | 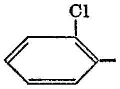 | 176-177 |
| 35 | 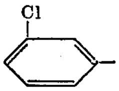 | 185-186.5 |
| 36 | 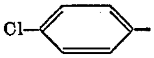 | 194-195 |
| 37 | 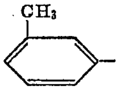 | 171-173 |
| 38 | 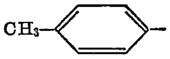 | 179-181 |
| 39 | 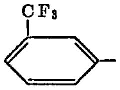 | 177-179 |
| 40 | 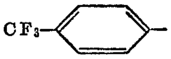 | 182-183 |
| 41 | 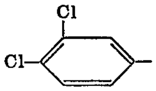 | 197-199 |
| 42 | 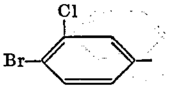 | 202-203 |
| 43 | 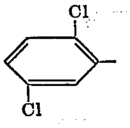 | 177-178 |
| 44 | 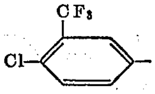 | 179-181 |
| 45 | 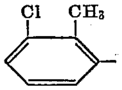 | 186-188 |

TABLE—Continued

| | $R_1$ | Melting point, ° C. (decomposition) |
|---|---|---|
| 46 | 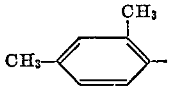 | 173-175 |
| 47 | 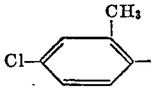 | 174-176 |
| 48 | 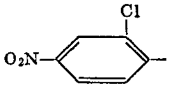 | 175-179 |
| 49 | 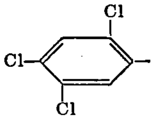 | 187-188 |

In a similar manner the compound of formula

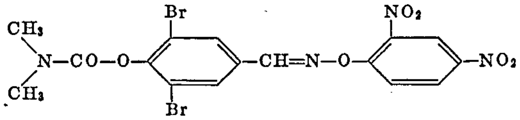

Melting point 158-160° [decomposition]

is obtained by reacting the Na salt of 3,5-dibromo-4-hydroxybenzaldoxime - O-2',4' - dinitrophenyl ether with dimethylcarbamoyl chloride.

The following compounds of the type of

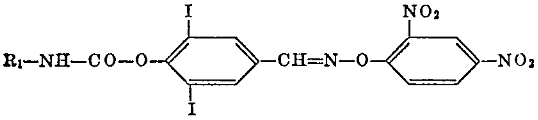

are obtained in an analogous manner to that which has been described for the manufacture of compound 36.

| | $R_1$ | Melting point, ° C. (decomposition) |
|---|---|---|
| Compound No.: | | |
| 51 | $CH_3$— | 207-208 |
| 52 | $C_2H_5$— | 202-204 |
| 53 | n-$C_3H_7$— | 199-200 |
| 54 | Cl—$CH_2$—$CH_2$— | 206-207 |
| 55 | 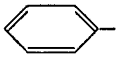 | 207-208 |
| 56 | 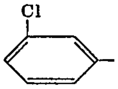 | 197-199 |
| 57 | 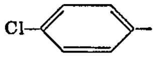 | 206-207 |
| 58 | 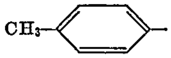 | 197-199 |
| 59 | 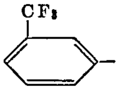 | 178-180 |

TABLE—Continued

| | $R_1$ | Melting point, ° C. (decomposition) |
|---|---|---|
| 60 | 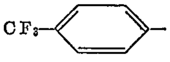 | 197-198 |
| 61 | 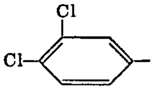 | 203-204 |
| 62 | 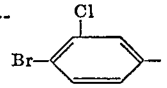 | 197-199 |
| 63 | 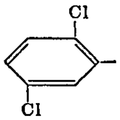 | 184-186 |
| 64 | 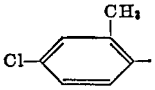 | 192-193 |
| 65 | 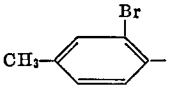 | 188-190 |
| 66 | 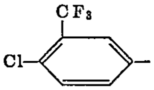 | 178-181 |
| 67 | 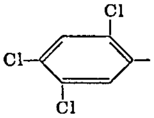 | 193-195 |

The following compounds of the type of

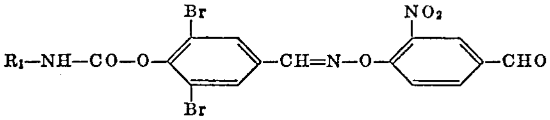

are obtained in an analogous manner

| | $R_1$ | Melting point, ° C. (decomposition) |
|---|---|---|
| 68 | $CH_3$— | 198-199 |
| 69 | $C_2H_5$— | 180-181 |
| 70 | 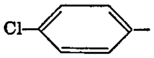 | 179-180 |
| 71 | 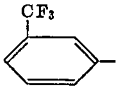 | 182-184 |
| 72 | 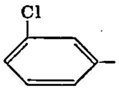 | 175-176 |
| 73 | 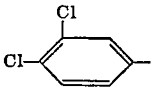 | 176-177 |
| 74 | 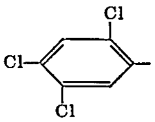 | 180-181 |

The following compounds are obtained in an analogous manner

No. 75

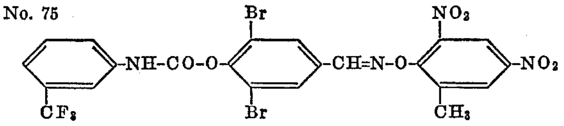

Melting point 124–126° C. [decomposition]

No. 76

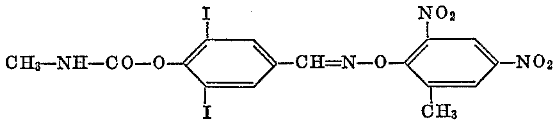

Melting point 173–174° C. [decomposition]

The following compounds of the type of

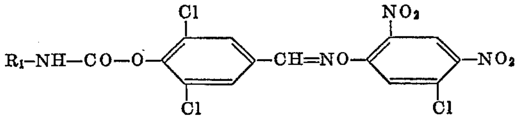

are obtained in an analogous manner

| | $R_1$ | Melting point, ° C. (decomposition) |
|---|---|---|
| Compound No.: | | |
| 77 | $CH_3$— | 185–188 |
| 78 | $ClCH_2$—$CH_2$— | 180–182 |
| 79 | 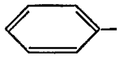 | 174–177 |
| 80 | 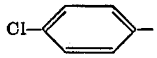 | 173–175 |
| 81 | 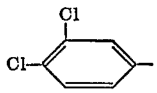 | 163–165 |
| 82 | 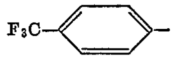 | 182–184 |
| 83 | 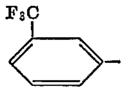 | 176–178<br>176–178 |
| 84 | 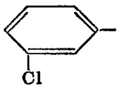 | 171–173 |
| 85 | 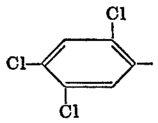 | 164–166 |

The following compounds of the type of

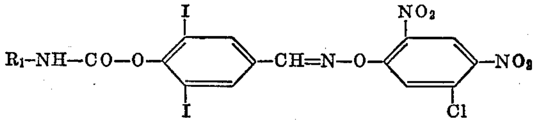

are obtained in an analogous manner

| | $R_1$ | Melting point, ° C. (decomposition) |
|---|---|---|
| Compound No.: | | |
| 86 | $CH_3$— | 209–210 |
| 87 | $ClCH_2CH_2$— | 206–207 |
| 88 | 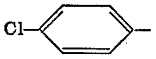 | 187–189 |
| 89 | 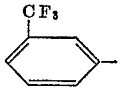 | 186–188 |
| 90 | 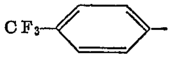 | 191–193 |
| 91 | 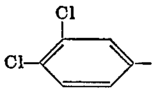 | 187–189 |

The following compounds of the type of

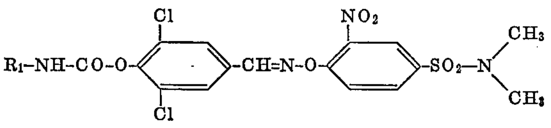

are obtained in an analogous manner

| | $R_1$ | Melting point, ° C. (decomposition) |
|---|---|---|
| Compound No.: | | |
| 92 | $CH_3$— | 180–181 |
| 93 | 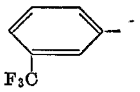 | 171–173 |
| 94 | 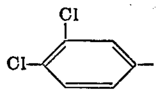 | 177–178 |

The following compounds of the type of

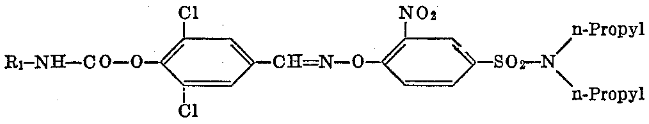

are obtained in an analogous manner

| | $R_1$ | Melting point, ° C. (decomposition) |
|---|---|---|
| Compound No.: | | |
| 95 | $CH_3$ | 187-188 |
| 96 | 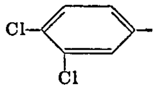 | 173-174 |

The following compounds of the type of

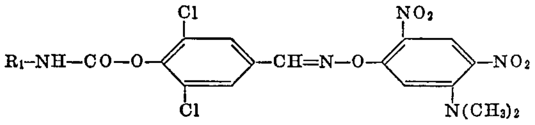

are obtained in an analogous manner

| | $R_1$ | Melting point, ° C. (decomposition) |
|---|---|---|
| Compound No.: | | |
| 97 | $CH_3—$ | 182-183 |
| 98 | $Cl—CH_2—CH_2—$ | 170-172 |
| 99 | 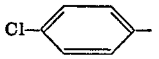 | 161-162 |
| 100 | 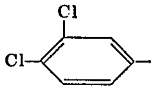 | 173-174 |
| 101 | 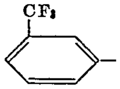 | 162-163 |

The following compounds of the type of

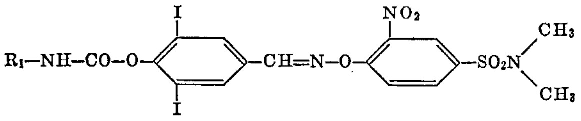

are obtained in an analogous manner

| | $R_1$ | Melting point, ° C. (decomposition) |
|---|---|---|
| Compound No.: | | |
| 102 | $CH_3—$ | 192-193 |
| 103 | 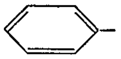 | 180-182 |
| 104 | 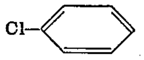 | 183-184 |
| 105 | 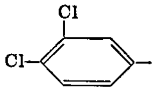 | 179-181 |

The following compounds of the type of

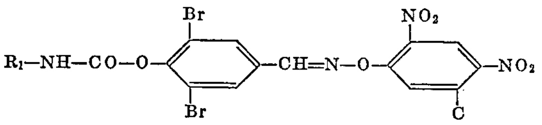

are obtained in an analogous manner

| | $R_1$ | Melting point, ° C. (decomposition) |
|---|---|---|
| Compound No.: | | |
| 106 | $Cl—CH_2—CH_2—$ | 189-190 |
| 107 | $C_6H_5—$ | 184-185 |
| 108 | 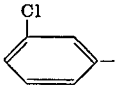 | 183-184 |
| 109 | 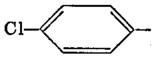 | 188-190 |
| 110 | 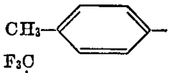 | 177-178 |
| 111 | 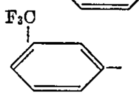 | 163-164 |
| 112 | 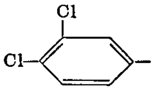 | 179-180 |

The following compounds of the type of

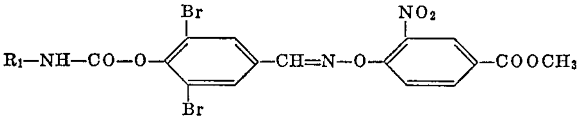

are obtained in an analogous manner

| | $R_1$ | Melting point, ° C. (decomposition) |
|---|---|---|
| Compound No.: | | |
| 113 | $CH_3—$ | 165-167 |
| 114 | 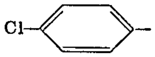 | 167-169 |
| 115 | 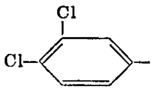 | 165-166 |
| 116 | 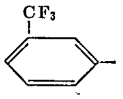 | 168-170 |
| 117 | 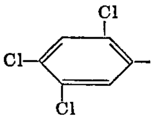 | 174-175 |

The following compounds of the type of

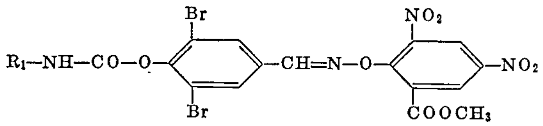

are obtained in an analogous manner

| | $R_1$ | Melting point, ° C. (decomposition) |
|---|---|---|
| Compound No.: | | |
| 118 | $CH_3—$ | 181-182 |
| 119 | $Cl—CH_2—CH_2—$ | 148-149.5 |
| 120 | 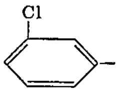 | 165-166 |
| 121 | 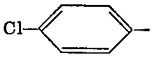 | 178-179 |
| 122 | 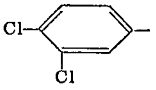 | 161-163 |

TABLE—Continued

| R₁ | | Melting point, ° C. (down position) |
|---|---|---|
| 123 | 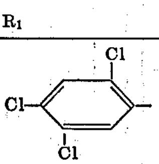 | 165-167 |
| 124 | 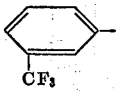 | 145-146 |
| 125 | 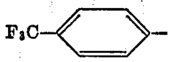 | 175-176 |

EXAMPLE 2

Examples of formulations

Dusting agents.—Equal parts of an active substance according to the invention and of precipitated silica are finely ground. Dusting agents which preferably contain 1–6% of active substance can be manufactured therefrom by mixing with kaolin or talc.

Spraying powders.—In order to manufacture a spraying powder the following components are for example mixed and finely ground: 50 parts of active substance according to the present invention, 20 parts of Hisil (highly adsorptive silica), 25 parts of bolus alba (kaolin), 3.5 parts of a reaction product of p-tert.octylphenol and ethylene oxide and 1.5 parts of sodium 1-benzyl-2-stearylbenzimidazole-6,3′-disulphonate.

Emulsion concentrate.—Easily soluble active substances can also be formulated as an emulsion concentrate in accordance with the following instructions: 20 parts of active substance, 70 parts of xylene and 10 parts of a mixture of a reaction product of an alkylphenol with ethylene oxide and calcium dodecylbenzene-sulphonate are mixed. On dilution with water to the desired concentration a sprayable emulsion results.

EXAMPLE 3

Selective herbicidal action

The compounds encompassed by Formula I show a good action in combatting dicotyledon plants in the post-emergent treatments.

The treatment of the experimental field with active substances according to the invention is carried out 12 days after sowing, when the plants have developed one to two new leaves after emerging. The amounts used are 2, 1 and 0.5 kg. of active substance per hectare.

The results are presented in the three tables which follow. As shown by the results, the compounds mentioned are throughout suitable for combatting dicotyledon plants in varieties of grain. Wheat, barley, oats and maize are completely spared by almost all compounds. Some compounds are tolerated by soya and flax cultures. The compounds 27, 33, 35, 38, 39, 40, 49, 72, 73, 113, 114, 116 and 118 are tolerated by rice. The active substances 89 and 91 only affect rice plants slightly but destroy the well-known rice weed Panicum.

The following ratings are applicable to the assessment in the tables: 1–2=no action, 3–4=slight damage, 5–7=severe damage and 8–9=plant died.

TABLE 1

| Compound No. | 27 | 33 | 35 | 36 | 37 | 38 | 39 | 41 | 47 | 49 |
|---|---|---|---|---|---|---|---|---|---|---|
| Variety of plant: | | | | | | | | | | |
| Triticum | 1 | 1 | 1 | 1 | 1 | 1 | 1 | 1 | 1 | 1 |
| Hordeum | 1 | 1 | 1 | 1 | 1 | 1 | 1 | 1 | 1 | 1 |
| Zea | 1 | 1 | 1 | 1 | 1 | 1 | 1 | 1 | 1 | 1 |
| Oryza | 2 | 1 | 1 | 3 | 3 | 1 | 1 | 4 | 3 | 1 |
| Sorghum | 1 | 1 | 1 | 1 | 1 | 1 | 1 | 1 | 2 | 1 |
| Panicum | 3 | 1 | 1 | 3 | 1 | 1 | 1 | 2 | 1 | 1 |
| *Beta vulg* | 9 | 9 | 9 | 9 | 9 | 9 | 9 | 9 | 9 | 9 |
| Galium | 9 | 9 | 4 | 9 | 6 | 9 | 8 | 9 | 9 | 3 |
| Calendula | 9 | 9 | 9 | 9 | 9 | 9 | 9 | 9 | 9 | 9 |
| Alopecurus | | | | | | | | | | |
| Chrysanthemum | 9 | 9 | 9 | 9 | 9 | 9 | 9 | 9 | 9 | 9 |
| Linum | 5 | 2 | 1 | 4 | 2 | 3 | 3 | 2 | 4 | 2 |
| Brassica | 9 | 9 | 9 | 9 | 9 | 9 | 9 | 9 | 9 | 5 |
| Ipomoea | 4 | 3 | 5 | 8 | 6 | 4 | 3 | 6 | 5 | 2 |
| Daucus | 5 | 3 | 5 | 8 | 6 | 5 | 3 | 6 | 5 | 1 |
| Soya | 3 | 3 | 2 | 4 | 2 | 2 | 2 | 2 | 3 | 1 |

NOTE.—Use amounts: 1 kg. of active substance/hectare.

TABLE 1A

| Improvement | 29 | 31 | 34 | 44 | 45 | 46 | 48 | 51 | 53 | 54 | 55 | 57 | 58 |
|---|---|---|---|---|---|---|---|---|---|---|---|---|---|
| Variety of plant: | | | | | | | | | | | | | |
| Triticum | 1 | 1 | 1 | 1 | 1 | 1 | 1 | 1 | 1 | 1 | 1 | 1 | 1 |
| Hordeum | 1 | 1 | 1 | 1 | 1 | 1 | 1 | 1 | 1 | 1 | 1 | 1 | 1 |
| Avena | 1 | 1 | 1 | 1 | 1 | 1 | 1 | 1 | 1 | 1 | 1 | 1 | 1 |
| Zea | 1 | 1 | 1 | 1 | 1 | 1 | 1 | 1 | 1 | 1 | 1 | 1 | 1 |
| Oryza | 4 | 1 | 1 | 1 | 2 | 1 | 1 | 1 | 4 | 5 | 3 | 1 | 3 |
| Digitaria | 1 | 1 | 1 | 1 | 1 | 1 | 1 | 1 | 1 | 1 | 1 | 1 | 1 |
| Sorghum | 1 | 1 | 1 | 1 | 1 | 1 | 1 | 1 | 3 | 2 | 2 | 1 | 2 |
| Panicum | 1 | 1 | 1 | 2 | 1 | 1 | 1 | 1 | 3 | 2 | 1 | 1 | 4 |
| Poa | 1 | 1 | 1 | 1 | 1 | 1 | 1 | 1 | 1 | 1 | 1 | 1 | 1 |
| Alopecurus | 1 | 1 | 1 | 1 | 1 | 1 | 1 | 1 | 2 | 1 | 2 | 1 | 1 |
| *Cyperus veg* | 1 | 1 | 1 | 1 | 1 | 1 | 1 | 1 | 1 | 1 | 1 | 1 | 1 |
| *Cynodon veg* | 1 | 1 | 1 | 1 | 1 | 1 | 1 | 1 | 1 | 1 | 1 | 1 | 1 |
| Beta | 9 | 9 | 9 | 9 | 9 | 9 | 9 | 9 | 9 | 9 | 9 | 9 | 9 |
| Galium | 9 | 6 | 5 | 7 | 9 | 4 | 4 | 7 | 5 | 5 | 3 | 3 | 4 |
| Calendula | 9 | 9 | 5 | 9 | 9 | 9 | 7 | 5 | 5 | 6 | 4 | 9 | 9 |
| Chrysanthemum | 9 | 9 | 9 | 9 | 9 | 6 | 7 | 8 | 8 | 9 | 9 | 9 | 9 |
| Linum | 1 | 4 | 3 | 2 | 3 | 9 | 1 | 4 | 5 | 7 | 5 | 8 | 7 |
| Brassica | 9 | 9 | 9 | 9 | 9 | 1 | 9 | 8 | 9 | 9 | 9 | 9 | 9 |
| Ipomoea | 2 | 1 | 2 | 3 | 3 | 1 | 1 | 4 | 5 | 1 | 8 | 4 | 3 |
| Stellaria | 3 | 6 | 5 | | | 3 | 4 | 7 | 5 | 9 | 6 | 7 | 9 |
| Soya | 3 | 1 | 3 | 3 | 4 | 3 | 1 | 3 | 4 | 4 | 4 | 2 | 3 |
| Gossypium | 8 | 9 | 9 | | | 9 | 9 | 9 | 5 | 9 | 5 | 7 | 9 |
| Amaranthus | 2 | 5 | 3 | | | 3 | 4 | 9 | 9 | 9 | 9 | 1 | 9 |

NOTE.—Use amounts: 1 kg. of active substance/hectare.

TABLE 1B

| Improvement | 60 | 66 | 68 | 69 | 71 | 74 | 76 | 79 | 80 | 82 | 83 | 84 | 85 | 92 |
|---|---|---|---|---|---|---|---|---|---|---|---|---|---|---|
| Variety of plant: | | | | | | | | | | | | | | |
| Triticum | 1 | 1 | 1 | 1 | 1 | 1 | 1 | 1 | 1 | 4 | 1 | 1 | 3 | 1 |
| Hordeum | 1 | 1 | 1 | 1 | 1 | 1 | 1 | 1 | 1 | 1 | 1 | 1 | 1 | 1 |
| Avena | 1 | 1 | 1 | 1 | 1 | 1 | 1 | 1 | 1 | 1 | 1 | 1 | 1 | 1 |
| Zea | 1 | 1 | 1 | 1 | 1 | 1 | 1 | 1 | 1 | 1 | 1 | 1 | 1 | 1 |
| Oryza | 1 | 3 | 3 | 3 | 3 | 1 | 1 | 1 | 1 | 1 | 1 | 1 | 1 | 1 |
| Digitaria | 1 | 1 | 1 | 1 | 1 | 1 | 1 | 1 | 1 | 1 | 1 | 1 | 1 | 1 |
| Sorghum | 1 | 3 | 1 | 1 | 1 | 1 | 1 | 1 | 1 | 1 | 1 | 1 | 1 | 1 |
| Panicum | 1 | 1 | 1 | 2 | 4 | 4 | 1 | 1 | 1 | 1 | 1 | 1 | 1 | 1 |
| Poa | 1 | 3 | 1 | 2 | 1 | 2 | 1 | 1 | 1 | 1 | 1 | 1 | 1 | 1 |
| Alopecurus | 1 | 2 | 3 | 1 | 1 | 2 | 1 | 1 | 1 | 1 | 1 | 1 | 1 | 1 |
| *Cyperus veg* | 1 | 1 | 1 | 1 | 1 | 1 | 1 | 1 | 1 | 1 | 1 | 1 | 1 | 1 |
| *Cynodon veg* | 1 | 1 | 1 | 1 | 1 | 1 | 1 | 1 | 1 | 1 | 1 | 1 | 1 | 1 |
| Beta | 9 | 9 | 9 | 9 | 9 | 9 | 9 | 9 | 9 | 9 | 9 | 9 | 9 | 9 |
| Galium | 4 | 4 | 4 | 9 | 4 | 1 | 3 | 2 | 3 | 1 | 1 | 1 | 1 | 1 |
| Calendula | 4 | 7 | 9 | 9 | 7 | 9 | 9 | 6 | 9 | 9 | 9 | 7 | 9 | 9 |
| Chrysanthemum | 8 | 6 | 9 | 9 | 9 | 9 | 9 | 9 | 9 | 9 | 9 | 9 | 9 | 9 |
| Linum | 3 | 6 | 4 | 6 | 5 | 5 | 8 | 4 | 3 | 4 | 2 | 4 | 3 | 5 |
| Brassica | 9 | 9 | 9 | 9 | 9 | 9 | 9 | 9 | 5 | 5 | 3 | 9 | 4 | 9 |
| Ipomoea | 5 | 4 | 4 | 9 | 5 | 4 | 4 | 1 | 3 | 2 | 1 | 1 | 1 | 3 |
| Stellaria | 4 | 9 | 5 | 9 | 9 | 5 | 7 | 9 | 9 | 9 | 9 | 7 | 9 | 2 |
| Soya | 4 | 4 | 4 | 4 | 6 | 4 | 2 | 3 | 2 | 2 | 1 | 2 | 2 | 1 |
| Gossypium | 8 | 7 | 9 | 9 | 9 | 9 | 7 | 9 | 7 | 8 | 7 | 5 | 6 | 6 |
| Amaranthus | 8 | 9 | 8 | 1 | 6 | 7 | ---- | 3 | ---- | ---- | ---- | 1 | ---- | 3 |

NOTE.—Use amounts: 1 kg. of active substance/hectare.

TABLE 1C

| Improvement | 111 | 112 | 115 | 117 |
|---|---|---|---|---|
| Variety of plant: | | | | |
| Triticum | 1 | 1 | 1 | 3 |
| Hordeum | 1 | 1 | 1 | 1 |
| Avena | 1 | 1 | 1 | 3 |
| Zea | 1 | 1 | 1 | 1 |
| Oryza | 1 | 1 | 1 | 1 |
| Digitaria | 1 | 1 | 1 | 1 |
| Sorghum | 1 | 1 | 1 | 1 |
| Panicum | 1 | 1 | 1 | 1 |
| Poa | 1 | 1 | 1 | 1 |
| Alopecurus | 1 | 1 | 1 | 1 |
| *Cyperus veg* | 1 | 1 | 1 | 1 |
| *Cynodon veg* | 1 | 1 | 1 | 1 |
| Beta | 9 | 9 | 9 | 9 |
| Galium | 1 | 1 | 1 | 7 |
| Calendula | 9 | 9 | 6 | 9 |
| Chrysanthemum | 9 | 9 | 9 | 7 |
| Linum | 5 | 6 | 5 | 3 |
| Brassica | 9 | 5 | 9 | 9 |
| Ipomoea | 1 | 1 | 6 | 4 |
| Stellaria | 9 | 5 | 8 | 5 |
| Soya | 2 | 3 | 4 | 3 |
| Gossypium | 9 | 7 | 9 | 9 |
| Amaranthus | 5 | 3 | ---- | ---- |

NOTE.—Use amounts: 1 kg. of active substance/hectare.

| | 1.0 kg. of active substance/hectare | | | | | | | | | | | 0.5 kg. of active substance/hectare | | | | | |
|---|---|---|---|---|---|---|---|---|---|---|---|---|---|---|---|---|---|
| | Triticum | Hordeum | Avena | Zea | Oryza | Calendula | Chrysanthemum | Linum | Brassica | Stellaria | Soya | Calendula | Chrysanthemum | Linum | Brassica | Stellaria | Soya |
| Compound No.: | | | | | | | | | | | | | | | | | |
| 70 | 1 | 1 | 1 | 1 | 3 | 9 | 9 | 9 | 9 | 8 | 4 | 9 | 9 | 5 | 9 | 7 | 4 |
| 73 | 1 | 1 | 1 | 1 | 2 | 9 | 9 | 5 | 9 | 9 | 5 | 9 | 9 | 4 | 9 | 7 | 3 |
| 72 | 1 | 1 | 1 | 1 | 2 | 9 | 9 | 6 | 9 | 9 | 5 | 9 | 9 | 4 | 9 | 7 | 4 |
| 113 | 3 | 1 | 1 | 1 | 1 | 9 | 9 | 4 | 9 | 9 | 4 | 9 | 9 | 3 | 9 | 9 | 3 |
| 114 | 1 | 1 | 1 | 1 | 1 | 9 | 9 | 3 | 9 | 9 | 3 | 9 | 9 | 3 | 9 | 9 | 3 |
| 116 | 3 | 1 | 3 | 1 | 1 | 9 | 9 | 3 | 9 | 9 | 3 | 9 | 9 | 3 | 9 | 9 | 3 |
| 118 | 1 | 1 | 1 | 1 | 1 | 9 | 9 | 5 | 9 | 9 | 4 | 9 | 9 | 3 | 9 | 9 | 3 |
| 119 | 1 | 1 | 1 | 1 | 3 | 9 | 9 | 6 | 9 | 9 | 3 | 9 | 9 | 5 | 9 | 9 | 3 |
| 120 | 1 | 1 | 1 | 1 | 3 | 9 | 9 | 4 | 9 | 9 | 3 | 9 | 9 | 4 | 9 | 9 | 2 |
| 121 | 1 | 1 | 1 | 1 | 3 | 9 | 9 | 7 | 9 | 9 | 3 | 9 | 5 | 6 | 9 | 9 | 2 |
| 122 | 1 | 1 | 1 | 1 | 3 | 9 | 9 | 5 | 9 | 9 | 4 | 9 | 9 | 4 | 9 | 9 | 3 |
| 123 | 1 | 4 | 1 | 1 | 3 | 9 | 9 | 4 | 7 | 9 | 4 | 9 | 9 | 4 | 7 | 9 | 3 |
| 124 | 1 | 1 | 1 | 1 | 3 | 9 | 9 | 6 | 9 | 9 | 5 | 9 | 9 | 4 | 6 | 9 | 4 |
| 125 | 1 | 1 | 1 | 1 | 3 | 9 | 9 | 4 | 9 | 9 | 4 | 9 | 9 | 4 | 9 | 9 | 3 |

| | 2 kg. of active substance/hectare | | | | | | | | | | | 1 kg. of active substance/hectare | | | | | | | | | | |
|---|---|---|---|---|---|---|---|---|---|---|---|---|---|---|---|---|---|---|---|---|---|---|
| | Triticum | Hordeum | Avena | Zea | Oryza | Soya | Galium | Calendula | Chrysanthemum | Linum | Brassica | Triticum | Hordeum | Avena | Zea | Oryza | Soya | Galium | Calendula | Chrysanthemum | Linum | Brassica |
| Compound No.: | | | | | | | | | | | | | | | | | | | | | | |
| 91 | 1 | 1 | 2 | 3 | 3 | 3 | ---- | 9 | 9 | 9 | 9 | 1 | 1 | 1 | 2 | 3 | 2 | ---- | 9 | 9 | 9 | 9 |
| 88 | 1 | 1 | 1 | 1 | 4 | 3 | 9 | 9 | 9 | 9 | 9 | 1 | 1 | 1 | 1 | 4 | 2 | 9 | 9 | 9 | 9 | 9 |
| 86 | 1 | 1 | 1 | 1 | 4 | 2 | 9 | 9 | 9 | 9 | 9 | 1 | 1 | 1 | 1 | 3 | 2 | 6 | 9 | 9 | 9 | 9 |
| 87 | 1 | 1 | 1 | 1 | 4 | 3 | 9 | 9 | 9 | 9 | 9 | 1 | 1 | 1 | 1 | 4 | 2 | 3 | 9 | 9 | 8 | 9 |
| 89 | 2 | 1 | 2 | 1 | 3 | 3 | 9 | 9 | 9 | 9 | 9 | 1 | 1 | 2 | 1 | 3 | 3 | 9 | 9 | 9 | 9 | 9 |
| 40 | ---- | ---- | ---- | ---- | ---- | ---- | ---- | ---- | ---- | ---- | ---- | 1 | 1 | 1 | 1 | 1 | 3 | 9 | 9 | 9 | 6 | 9 |
| 104 | ---- | ---- | ---- | ---- | ---- | ---- | ---- | ---- | ---- | ---- | ---- | 1 | 1 | 1 | 1 | 3 | 3 | 8 | 6 | 9 | 4 | 9 |
| 63 | ---- | ---- | ---- | ---- | ---- | ---- | ---- | ---- | ---- | ---- | ---- | 1 | 1 | 1 | 1 | 2 | 3 | 7 | 7 | 9 | 7 | 9 |
| 64 | ---- | ---- | ---- | ---- | ---- | ---- | ---- | ---- | ---- | ---- | ---- | 1 | 1 | 2 | 1 | 4 | 4 | 6 | 9 | 9 | 9 | 9 |
| 102 | ---- | ---- | ---- | ---- | ---- | ---- | ---- | ---- | ---- | ---- | ---- | 1 | 1 | 1 | 1 | 4 | 4 | 9 | 9 | 9 | 9 | 9 |
| 103 | ---- | ---- | ---- | ---- | ---- | ---- | ---- | ---- | ---- | ---- | ---- | 1 | 1 | 1 | 1 | 3 | 3 | 5 | 6 | 8 | 5 | 9 |
| 105 | ---- | ---- | ---- | ---- | ---- | ---- | ---- | ---- | ---- | ---- | ---- | 1 | 1 | 1 | 1 | 5 | 2 | 9 | 9 | 9 | 9 | 9 |
| 65 | ---- | ---- | ---- | ---- | ---- | ---- | ---- | ---- | ---- | ---- | ---- | 1 | 1 | 1 | 1 | 4 | 3 | 6 | 9 | 9 | 7 | 9 |
| 90 | ---- | ---- | ---- | ---- | ---- | ---- | ---- | ---- | ---- | ---- | ---- | 1 | 1 | 1 | 1 | 4 | 3 | 5 | 9 | 7 | 5 | 9 |

For comparative purposes the results obtained in this test with previously known substances with partly similar chemical structure are shown in Table II.

The compounds thus tested are (A)

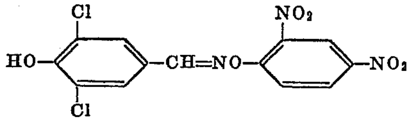

known from the French Patent No. 1,494,078

(B)

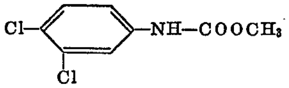

methyl-3,4-dichloro-carbanilate known from the U.S. Pat. No. 3,116,995 and (C)

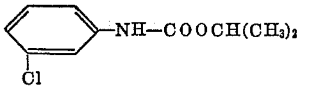

isopropyl-N-(3-chlorophenyl)carbamate, known under the trade name CIPC.

| | Compound | | | | | |
|---|---|---|---|---|---|---|
| | A | | B | | C | |
| | Amount applied in kg./ha. | | | | | |
| | 2 | 1 | 2 | 1 | 2 | 1 |
| Variety of plant: | | | | | | |
| Triticum | 1 | 1 | 2 | 1 | 3 | 2 |
| Hordeum | 1 | 1 | 2 | 1 | 3 | 2 |
| Avena | 1 | 1 | 2 | 1 | 5 | 4 |
| Zea | 1 | 1 | 3 | 2 | 5 | 4 |
| Oryza | 1 | 1 | 2 | 1 | 2 | 2 |
| Digitaria | 1 | 1 | 3 | 2 | 4 | 2 |
| Sorghum | 1 | 1 | 2 | 2 | 2 | 1 |
| Panicum | 1 | 1 | 3 | 2 | 3 | 2 |
| Poa | 1 | 1 | 7 | 4 | 5 | 5 |
| Alopecurus | 1 | 1 | 3 | 1 | 5 | 5 |
| *Cyperus veg.* | 1 | 1 | 1 | 1 | 1 | 1 |
| *Cynodon veg* | 1 | 1 | --- | --- | 1 | 1 |
| Beta | 9 | 9 | 9 | 9 | 5 | 3 |
| Galium | 4 | 2 | 3 | 1 | 4 | 3 |
| Calendula | 9 | 9 | 2 | 2 | 2 | 1 |
| Chrysanthemum | 9 | 9 | 2 | 2 | 1 | 1 |
| Linum | 9 | 9 | 9 | 4 | --- | --- |
| Sinapis | --- | --- | --- | --- | 4 | 4 |
| Brassica | 9 | 9 | 9 | 4 | 4 | 3 |
| Ipomoea | 2 | 1 | 7 | 5 | 3 | 3 |
| Stellaria | 5 | 3 | 9 | 4 | 5 | 4 |
| Soya | 4 | 4 | 7 | 4 | 4 | 3 |
| Gossypium | 3 | 3 | 3 | 3 | 3 | 2 |
| Amaranthus | 4 | 3 | 8 | 4 | 1 | 1 |

EXAMPLE 4

Several compounds of the present application were compared in a field test with the compound

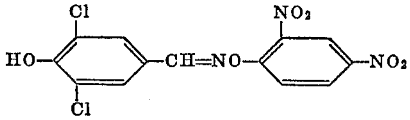

(A)

known from the French Pat. No. 1,494,078.

In an open field, small lots were seeded with the culture crop, peas, soya, summer and winter wheat. Two weeks after sowing, when the plants had reached the 2–3 leaf stage, they were sprayed with the testing liquor, so that the final amount of active substance applied corresponded to 1 respectively 2 kg. per hectare.

The testing liquor consisted of a 1% sprayable dispersion obtained from the following composition by dilution with water:

50% of one of the active compounds to be tested
33.5% of bolus alga (kaolin)
11% of the ammonium salt of ligninsulfonic acid
4.5% of sodium dinaphtylmethanedisulfonate (product commercially available under the trade name "Neradol").

The assessment of the test was made 4 weeks after the treatment and the plants were evaluated according to the following key:

| Note | Crop | Weed |
|---|---|---|
| 1 (optimum) | No damage, as control | Plants killed. |
| 2–4 | Slight coverable damage | Heavy damage. |
| 5–8 | Heavy irreversible damage | Slight recoverable damage. |
| 9 | Plant killed | No damage, same as untreated control. |

The results are given in the following table.

One note is given for the crop, another for the evaluation of the weeds in that particular lot in general and a third one for the problem weed in each individual lot.

| | Compound tested | | | | | | | | | | | |
|---|---|---|---|---|---|---|---|---|---|---|---|---|
| | A | | 65 | | 40 | | 63 | | 64 | | 92 | |
| Concentration applied in kg./ha. | 1 | 2 | 1 | 2 | 1 | 2 | 1 | 2 | 1 | 2 | 1 | 2 |
| Crop: soya | | 6 | --- | 4 | --- | 5 | --- | 4 | --- | 3 | --- | 4 |
| Weeds in general | | 6 | --- | 3 | --- | 6 | --- | 5 | --- | 4 | --- | 3 |
| Crop: winter wheat | 1 | --- | 1 | --- | 1 | --- | 2 | --- | 1 | --- | 1 | --- |
| Weeds in general | 6 | --- | 3 | --- | 4 | --- | 4 | --- | 5 | --- | 3 | --- |
| *Veronica arvensis* | 9 | --- | 2 | --- | 6 | --- | 1 | --- | 2 | --- | 2 | --- |
| Crop: summer wheat | 1 | 1 | 1 | 1 | 1 | 1 | 1 | 1 | 1 | 2 | 1 | 1 |
| Weeds in general | 5 | 4 | 4 | 3 | 3 | 4 | 3 | 3 | 4 | 3 | 2 | 2 |
| *Rumex acetosella* | 5 | 5 | 4 | 1 | 3 | 4 | 2 | 1 | 3 | 1 | 1 | 1 |

In these field tests, in post emergence application of 1 and/or 2 kg. per hectare, the compounds of the present application show selective herbicidal activity in crops of soya and excellent selective herbicidal activity in crops of summer and winter wheat.

The compound A according to the French Pat. No. 1,494,231 shows in the same tests no selective herbicidal activity in soya and though it is very compatible towards wheat, its weed controlling ability is not satisfactory.

EXAMPLE 5

In order to test the acaricidal action, phaseolus plants in the two-leaf stage are infested, 12 hours before the treatment, by placing pieces of leaf attacked by spinning mites on them. After 12 hours a population in all stages of development is present on the test plant.

The active substance No. 75 was sprayed in the form of an emulsion onto the plant through a fine atomiser in such a way that a uniform deposit of droplets was produced on the surface of the leaf. After 7 days the mortality was determined and expressed as a percentage. The following mortality values were determined for two varieties of spinning mite after 2 and 7 days:

(a) *Tetranychus urticae*

| Concentration (p.p.m.) | Adults, percent | | Larvae, percent | | Eggs, percent |
|---|---|---|---|---|---|
| | 2 days | 7 days | 2 days | 7 days | 7 days |
| 800 | 100 | 80 | 100 | 80 | 60 |
| 400 | 80 | 80 | 80 | 80 | 60 |
| 200 | 60 | 0 | 60 | 60 | 0 |
| 100 | 0 | --- | 0 | 0 | --- |

(b) *Tetranychus telarius*

| Concentration (p.p.m.) | Adults, percent | | Larvae, percent | | Eggs, percent |
|---|---|---|---|---|---|
| | 2 days | 7 days | 2 days | 7 days | 7 days |
| 800 | 100 | 80 | 100 | 80 | 60 |
| 400 | 80 | 80 | 100 | 80 | 60 |
| 200 | 60 | 60 | 80 | 60 | 60 |
| 100 | 0 | 0 | 0 | 0 | 0 |

What we claim is:

1. Compounds of the formula

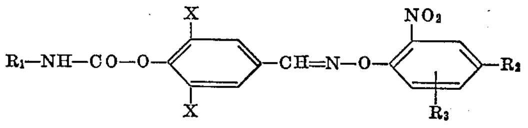

wherein $R_1$ is a lower alkyl radical, with 1 to 4 carbon atoms, which is unsubstituted or substituted by a chlorine atom, a phenyl radical that is unsubstituted or mono to trisubstituted by members of the group consisting of halogen atoms, methyl, methoxy, trifluoromethyl or nitro groups, or $R_1$ is the benzyl phenylethyl or cyclohexyl radical;

$R_2$ is a nitro, formyl, methoxycarbonyl or di-lower alkyl sulfamyl radical, wherein the lower alkyl groups have 1 to 4 carbon atoms;

$R_3$ is a hydrogen or chlorine atom, a lower alkyl, lower alkoxy group with 1 to 4 carbon atoms, the methoxycarbonyl or di-methylsulfamyl group and X are identical and represent chlorine, bromine or iodine atoms.

2. Compounds according to claim 1 of formula

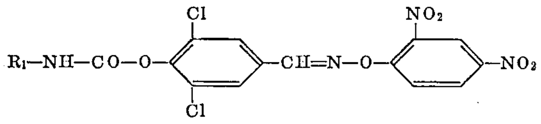

wherein $R_1$ has the meaning given in claim 1.

3. Compounds according to claim 1 of formula

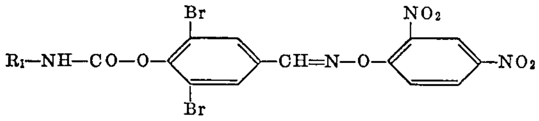

wherein $R_1$ has the meaning given in claim 1.

4. Compounds according to claim 1 of formula

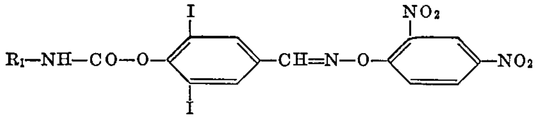

wherein $R_1$ has the meaning given in claim 1.

5. Compounds according to claim 1 of formula

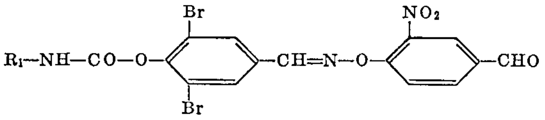

wherein $R_1$ has the meaning given in claim 1.

6. Compounds according to claim 1 of formula

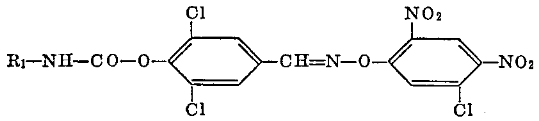

wherein $R_1$ has the meaning given in claim 1.

7. Compounds according to claim 1 of formula

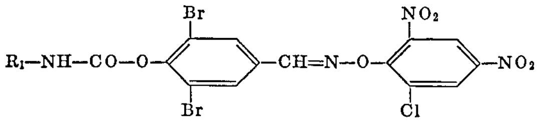

wherein $R_1$ has the meaning given in claim 1.

8. Compounds according to claim 1 of formula

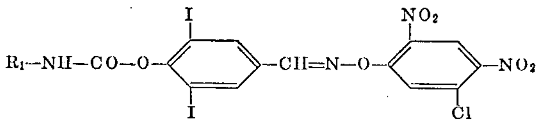

9. Compounds according to claim 1 of formula

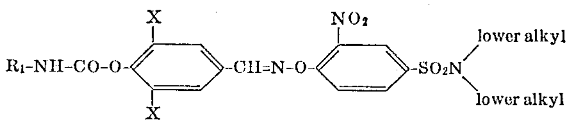

wherein $R_1$ and X have the meaning given in claim 1.

10. Compounds according to claim 1 of formula

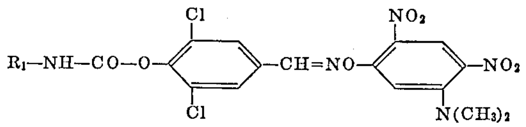

wherein $R_1$ has the meaning given in claim 1.

11. Compounds according to claim 1 of the formula

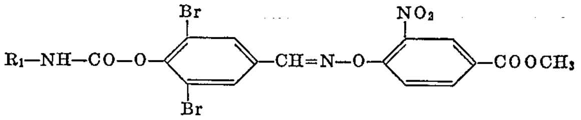

wherein $R_1$ has the meaning given in claim 1.

12. Compounds according to claim 1 of the formula

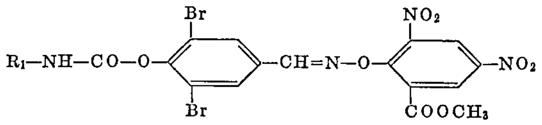

wherein $R_1$ has the meaning given in claim 1.

13. The compound according to claim 3 of the formula

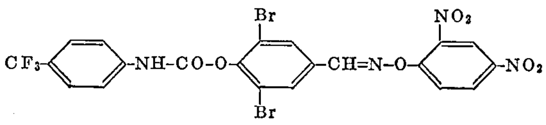

References Cited

UNITED STATES PATENTS 3,492,333 1/1970 Pickore et al. ------ 260—472

LORRAINE A. WEINBERGER, Primary Examiner

L. A. THAXTON, Assistant Examiner

U.S. Cl. X.R.

71—106, 111; 260—468 E, 471 R, 479 C; 424—300

UNITED STATES PATENT OFFICE
CERTIFICATE OF CORRECTION

Patent No. 3,772,385 Dated November 13, 1973

Inventor(s) Adolf Hubele

It is certified that error appears in the above-identified patent and that said Letters Patent are hereby corrected as shown below:

The following should be inserted in the heading:

Claims priority, application Switzerland
January 5, 1968, No. 121/68

Signed and sealed this 16th day of July 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,772,385 Dated November 13, 1973

Inventor(s) Adolf Hubele

It is certified that error appears in the above-identified patent and that said Letters Patent are hereby corrected as shown below:

Column 20, claim 8, line 6, after the formula insert the following:

wherein $R_1$ has the meaning given in claim 1

Signed and sealed this 11th day of February 1975.

(SEAL)
Attest:

RUTH C. MASON
Attesting Officer

C. MARSHALL DANN
Commissioner of Patents
and Trademarks